Feb. 20, 1934.  C. H. KINDL  1,948,036

SHOCK ABSORBER

Filed Oct. 5, 1931  2 Sheets-Sheet 1

Inventor
CARL H. KINDL
By Spencer, Hardman and Fehr
Attorneys

Feb. 20, 1934.  C. H. KINDL  1,948,036
SHOCK ABSORBER
Filed Oct. 5, 1931  2 Sheets-Sheet 2

Inventor
CARL H. KINDL

By Spencer, Hardman & John
Attorneys

Patented Feb. 20, 1934

1,948,036

UNITED STATES PATENT OFFICE 1,948,036

SHOCK ABSORBER

Carl H. Kindl, Dayton, Ohio, assignor to Delco Products Corporation, Dayton, Ohio, a corporation of Delaware Application October 5, 1931. Serial No. 566,930

5 Claims. (Cl. 188—88)

This invention relates to improvements in hydraulic shock absorbers.

It is among the objects of the present invention to provide a double-acting hydraulic shock absorber having a fluid reservoir and two fluid compression chambers, the shock absorber being so constructed and arranged that the fluid is ejected from one compression chamber into the other.

Another object of the present invention is to provide a shock absorber of the double-acting type capable of being produced commercially at a minimum expense of time and material.

Further objects and advantages of the present invention will be apparent from the following description, reference being had to the accompanying drawings wherein a preferred embodiment of one form of the present invention is clearly shown.

Figure 1:
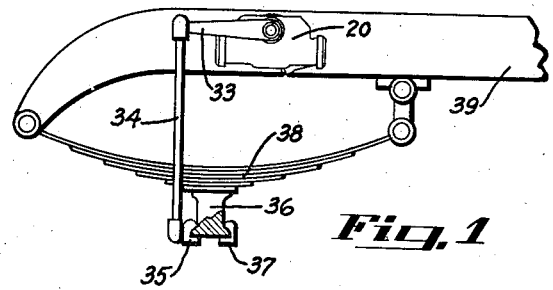
Fig. 1 is a fragmentary side view of the vehicle chassis having a shock absorber embodying the present invention applied thereto. The wheels of the vehicle have been omitted for the sake of clearness.
Figure 2:
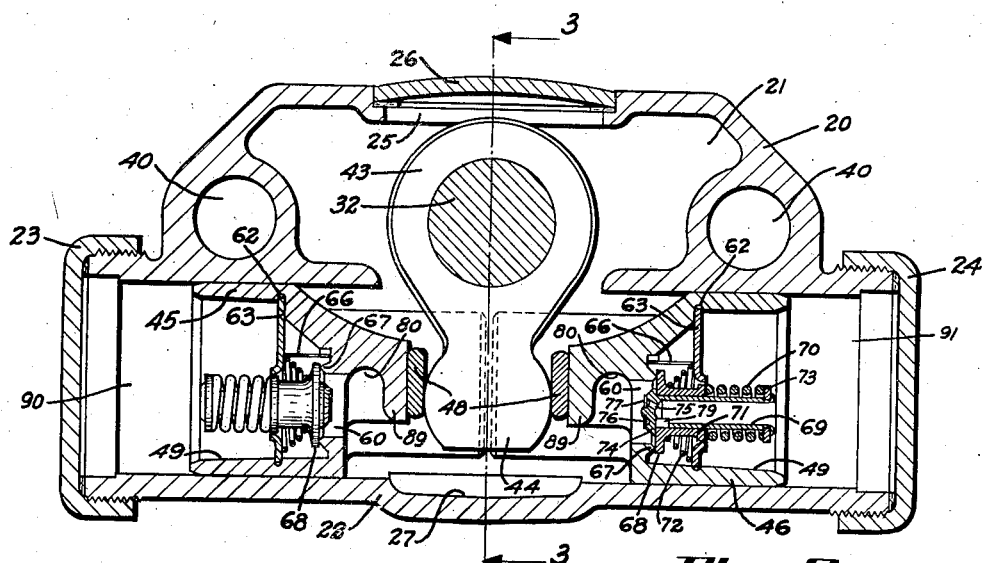
Fig. 2 is a longitudinal sectional view taken through the shock absorber.
Figure 3:
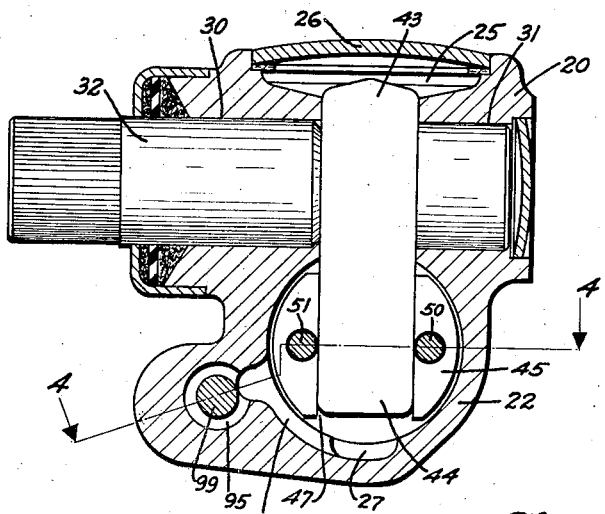
Fig. 3 is a transverse sectional view taken substantially along the line 3—3 of Fig. 2.

Referring to the drawings, the shock absorber 40 is shown comprising a casing 20 providing a fluid reservoir 21 and a cylinder 22. The ends of the cylinder are closed by cylinder head caps 23 and 24 provided with proper gaskets to prevent leaks. An opening 25 in the top of the casing is closed by a cover member 26. In Fig. 2 the cylinder 22 is shown having a central recess 27.

In the casing 20 are aligned bearings 30 and 31 in which a rocker shaft 32 is journalled, one end of the rocker shaft extending outside the casing and having the shock absorber operating arm 33 attached thereto. The free end of this arm is swivelly connected to one end of a link 34, the opposite end of which is swivelly secured to a bracket 35 anchored to the vehicle axle 36 by clamping member 37. Axle 36 supports vehicle springs 38 which in turn support the frame 39 of the vehicle to which the shock absorber casing is secured, preferably by bolts passing through the openings 40 in the casing.

Within the casing 20, rocker shaft 32 supports a rocker arm or lever 43, which has a portion 44 extending into the cylinder 22.

Figure 4:
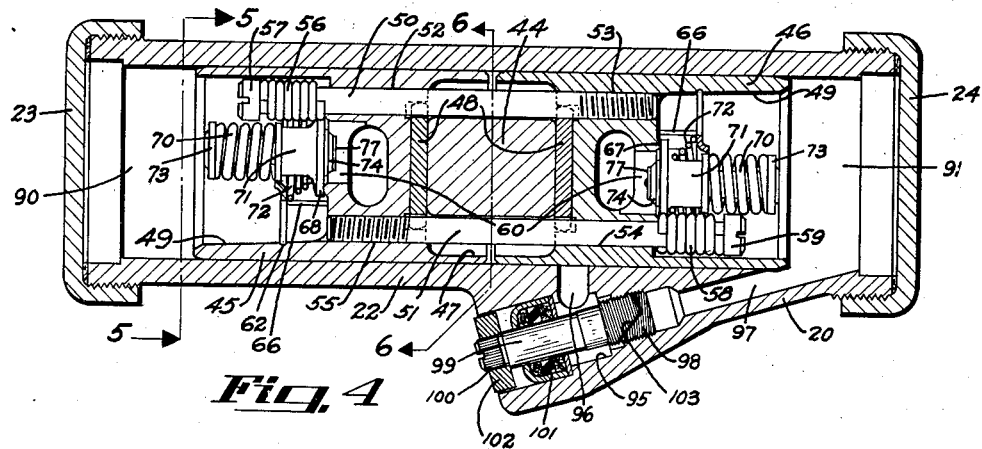
Fig. 4 is a detail sectional view taken substantially along the line 4—4 of Fig. 3.
Figure 5:
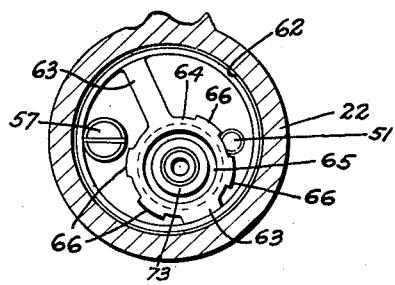
Fig. 5 is a section taken along the line 5—5 of Fig. 4.
Figure 6:
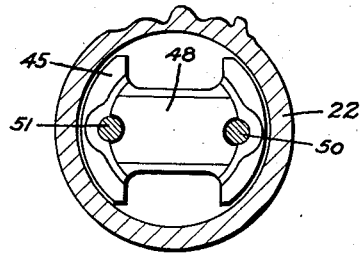
Fig. 6 is a section taken along the line 6—6 of Fig. 4.

Arm 43 extending into the cylinder 22 is the operating member for the fluid displacement member or piston comprising piston heads 45 and 46. Adjacent ends of the piston heads are recessed as at 47, forming a space between the two pistons into which the portion 44 of the arm 43 extends. Each piston head has a wearpiece 48 secured thereto in any suitable manner, these wearpieces being so dimensioned that when they engage the respective sides of the lever 43 the adjacent ends of the piston heads 45 and 46 will be in substantially close proximity as shown in Figs. 2 and 4. The outer end of each piston head 45 and 46 is recessed as at 49. The two piston heads 45 and 46 are maintained in proper relation so that their respective wearpieces 48 engage with the rocker arm portion 44 by bolts 50 and 51. Bolt 50 extends slidably through a channel 52 in the piston head 45 and threadedly engages the piston head 46 as at 53. Bolt 51 slidably extends through opening or channel 54 in the piston head 46 and threadedly engages the piston head 45 as at 55. A spring 56 is provided about bolt 50 and is interposed between its head 57 and the bottom wall of recess 49 in piston 45. A similar spring 58 about bolt 51 is interposed between the head 59 of said bolt and the inner wall of the recess 49 in piston 46. Both these springs act to maintain the wearpieces 48 of the pistons against the rocker arm portion 44, as may clearly be understood.

Each piston head 45 and 46 is provided with a fluid flow passage 60 adapted to transfer fluid from one side of the piston head to the other. Each piston head is also provided with a fluid flow control device for regulating and controlling the flow of fluid through its passage in either direction, and inasmuch as the fluid flow control device of both pistons are substantially alike, only one of them will be described for the sake of brevity.

Figure 7:
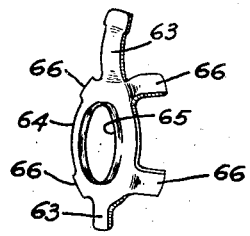
Fig. 7 is a perspective view of the spider valve cage.
Figure 8:
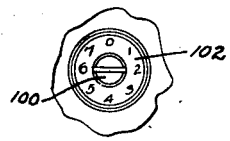
Fig. 8 is a view of the adjustable fluid flow controlling device.

The annular wall of recess 49 in piston head 45 has an annular groove 62 for receiving the supporting legs 63 of the valve cage spider 64. This spider has a central disc portion provided with a central opening 65. Angular feet 66 on the spider, shown in Fig. 7 engage the bottom wall of the recess 49 in the piston head 45 when the spider is in position in the annular groove 62 of said piston head, said angular feet acting as spacers to hold the spider 64 in proper spaced relation with an annular ridge 67 about the opening 60, which ridge forms a valve seat. The valve for engaging seat 61 is designated by the numeral 68 and is clearly shown in section in Fig. 2. Valve 68 has a tubular body portion 71. A spring 72 is interposed between the valve 68 and the spider cage member 64, this spring being spirally wound, the larger convolution of which engages the inner surfaces of the spacer feet 66 as shown in Figs. 2 and 4. This spring maintains valve 68 in engagement with the annular valve seat 67.

As shown in Figs. 2 and 4, the tubular portion 71 of valve 68 extends through the central opening 65 of the spider valve cage. This tubular body portion 71 of valve 68 slidably supports a tubular valve 69 having an abutment washer 73 secured at its one end, the opposite end being provided with a valve head 74 which is adapted to seat upon the face of valve 68. The head 74 of valve 69 has a through-passage 75 which communicates with an annular groove 76 in the outer face of the head 74. A spring disc 77 secured to the valve head 74 in any suitable manner, centrally however, is yieldably urged to close the annular groove 76. This is clearly shown in the section of Fig. 2. A spring 70 about the tubular valve 69 and interposed between the abutment member 73 and the tubular portion 71 of valve 68 urges the valve 69 so that its head portion 74 is normally in engagement with the outer surface of the valve 68. An opening 79 in the side wall of the tubular valve 69 is normally maintained within the tubular portion 71 of valve 68, thereby preventing fluid flow through the valve 69 and its side port 79 until valve 69 has been moved so that its head is moved away from the surface of the valve 68.

As shown in Fig. 2, both piston heads have transverse recesses 80 providing depending aprons 89 in front of each respective piston passage 60, said aprons 89 acting as deflectors for the fluid passing from the respective compression chambers through the passages 60 downwardly toward the recess 27 in the cylinder 22. The compression chamber within cylinder 22 formed by the piston head 45 is designated by the numeral 90, said chamber being termed the spring compression control chamber, while piston head 46 forms the compression chamber 49 which is termed the spring rebound control chamber.

The central recess 27 of the cylinder 22 is in communication with a recess 95 in the casing 20 through a cross-passage 96. Recess 95 in turn communicates with the spring rebound control chamber 91 through duct or passage 97, as shown in Fig. 4. A portion of this duct 97 is threaded as at 98 for receiving the threaded end of a fluid flow controlling valve pin 99, the end of which extends to the outside of the casing as at 100. A packing 101 is provided in the recess 95 to prevent fluid leaks at this point. 102 is a plate provided with graduations for indicating the point of adjustment of the fluid flow controlling valve pin 99. This pin may be of any suitable type, however in the present instance and for purposes of illustration, the threaded end of the pin threadedly engaging the portion 98 of the channel 97 has an angular face 103 which, when properly adjusted, provides for variable openings between the channel or duct 97 and the recess 95.

The operation of the shock absorber is as follows:

When the spring 38 is compressed, that is, moved upwardly toward the frame 39 due to the road wheels of the vehicle striking an obstruction in the roadway, link 34 and arm 33 will move the rocker arm 43 clockwise as regards Fig. 2 and thus the piston head 46 will be moved to exert pressure upon the fluid within the spring compression control chamber 90. When the pressure in this chamber reaches a proper degree, the fluid pressure acting through the tubular valve 69 will flex the spring disc 77 so as to establish an initial flow of fluid through the valve 69, passage 75, annular groove 76 and through the orifice presented between the flexed disc 77 and the end surface of the valve head 74, through passage 60 of the piston head 46, thence downwardly into the space beneath the pistons which includes the recess 27 in the cylinder 22. Under these circumstances piston 46 is also moving to follow piston 45 and thus the fluid will move valve 68 from its seat against the effect of spring 72 to establish a flow of fluid through port 60 of piston 46, past valve 68 into the spring rebound control chamber 91. If the pressure within the compression chamber 90 reaches a predetermined higher value, then the valve 69 is moved bodily relative to the tubular portion 71 of valve 68 against the effect of spring 70 and thus the side opening 79 of the valve 69 is movable outside the confines of the tubular portion 71 of the valve 68, the opening of side opening 79 establishing a fluid flow through valve 69, side openings 79 between valves 68 and valve head 74 through the passage 60 of piston 45, the fluid then flowing to the compression chamber 91 through the passage beneath the pistons, passage 60 of piston 46 past the valve 68. In both instances the fluid flow of passage 60 and piston 45 toward the center chamber beneath the piston is restricted and thus the movement of the piston 45 toward the left is resisted and consequently the compression movement of the vehicle springs 38 is likewise resisted or cushioned.

Upon the return movement of the spring 38, which movement is termed the rebound movement, the link 34 and arm 43 will operate rocker arm 43 counter-clockwise as regards Fig. 2 and now the pistons 45 and 46 are moved toward the right so that pressure is exerted upon the fluid within the spring rebound control chamber 91. The fluid flow from this chamber 91 is controlled in a manner similar to that described in connection with the chamber 90, that is an initial flow is first established through the valve 69 and its passage 75, then when the pressure has attained a higher value, valve 69 is moved bodily, uncovering the side opening 77, establishing a restricted flow of fluid through said opening and thereby resisting the movement of the piston 46 toward the right, consequently cushioning the rebound movement of the vehicle springs.

The rebound chamber 91 as has been described heretofore, is in communication with the central chamber between the piston heads 45 and 46 through the passage 97, the flow of fluid therethrough being constantly restricted by the adjustable valve pin 99. Thus, really, before any fluid flow is established through the pressure release valves in the piston head 46, an initial flow is established from chamber 91 to passage 97, past the tapered head 103 of the valve pin 99, through recess 95, close passage 96 into the recess 27 of the cylinder 22. It will of course be understood that to vary the flow of fluid through this by-pass, that is, to vary the restriction to the flow of fluid therethrough, valve pin 99 may be adjusted, screwing it out, reducing the restriction, and screwing it in, increasing said restriction.

In the present invention applicant provides a shock absorber in which fluid is discharged from one chamber into the other through channels beneath the piston heads and the rocker arm, the pistons being sufficiently close together and the opening therebetween being closed by the operating arm portion 44 so that practically very little of the fluid discharge from one compression chamber will reach the fluid within the reservoir 21. The fluid in reservoir 21 is provided for purposes of replenishing any fluid supply within the compression chambers which may partially be depleted through leaks past the pistons or at other points.

While the form of embodiment of the present invention as herein disclosed, constitutes a preferred form, it is to be understood that other forms might be adopted, all coming within the scope of the claims which follow.

What is claimed is as follows:

1. A hydraulic shock absorber comprising, in combination; a casing providing a fluid reservoir and a cylinder; a piston in each end of said cylinder; a piston operating member oscillatably supported by the casing and extending between said pistons; a headed connecting member slidably extending through one piston and threadedly engaging the other piston; a spring interposed between the head of said connecting member and the piston slidable relative thereto; a duct in each piston providing for the transfer of fluid therethrough; and valves in each piston for controlling the fluid flow through said piston ducts in both directions.

2. A hydraulic shock absorber comprising, in combination, a casing providing a fluid reservoir and a cylinder; two pistons in said cylinder, adjacent ends of said pistons having recesses forming a space when said pistons are moved in juxtaposition; a lever oscillatably supported in said casing and extending into said space provided by the pistons; rods connecting the pistons, each rod threadedly engaging one piston and slidably extending through the other; a spring on each rod yieldably urging the piston slidably thereon toward the lever and pulling the piston threadedly engaged thereby against said lever; a duct in each piston providing for the transfer of fluid through said piston; a baffle on each piston deflecting the flow of fluid through the respective piston ducts toward the bottom of the cylinder and away from the lever; and valves in each piston for establishing controlled flows of fluid through the piston ducts in either direction.

3. A hydraulic shock absorber comprising, in combination, a casing providing a fluid reservoir and a cylinder; two pistons in said cylinder, adjacent ends of said pistons having recesses forming a space when said pistons are moved in juxtaposition; a lever oscillatably supported in said casing and extending into said space provided by the pistons; rods connecting the pistons, each rod threadedly engaging one piston and slidably extending through the other; a spring on each rod yieldably urging the piston slidably thereon toward the lever and pulling the piston threadedly engaged thereby against said lever; whereby the adjacent faces of the pistons are brought relatively close together; a port in each piston connecting with a chamber formed by recesses in the bottom of both pistons and the cylinder wall; a baffle on each piston adapted to deflect fluid flowing from the piston port downwardly into said chamber; and a compound valve mechanism in each piston adapted to establish a substantially free flow of fluid through the piston port in one direction and a restricted flow in the other.

4. A shock absorber comprising, in combination, a casing providing a fluid reservoir and a cylinder; a fluid displacement member in said cylinder; a port in said member; an annular ridge about said port providing a valve-seat; a lever for reciprocating said member; and a compound fluid flow control for said port comprising a tubular valve having an enlarged head portion and an opening in its side wall adjacent the head portion; a disc valve slidably fitting upon the tubular valve and together with the head of the tubular valve forming a closure for the port; a retainer having a central opening through which the tubular valve extends and radially extending legs fitting into an annular groove in the fluid displacement member, angular spaces on the retainer engaging said member to hold the retainer properly spaced from the valve-seat; a spring between the disc-valve and retainer yieldably urging the disc-valve upon the annular seat; and a spring between the disc and tubular valves urging the head of the tubular valve against the disc valve so that the opening in the side wall of the tubular valve is confined and closed by the disc valves.

5. An hydraulic shock absorber comprising, in combination, a casing providing a fluid reservoir and a cylinder; two pistons in said cylinder forming a compression chamber at each end thereof; an operating member oscillatably supported within the casing and having a portion extending between said pistons; bolts securing said pistons together, each bolt slidably extending through one piston and threadedly engaging the other piston respectively; a spring interposed between the head of each bolt and the adjacent piston, whereby the pistons are urged into constant engagement with the operating member; and valved ducts leading from each compression chamber.

CARL H. KINDL.